UNITED STATES PATENT OFFICE.

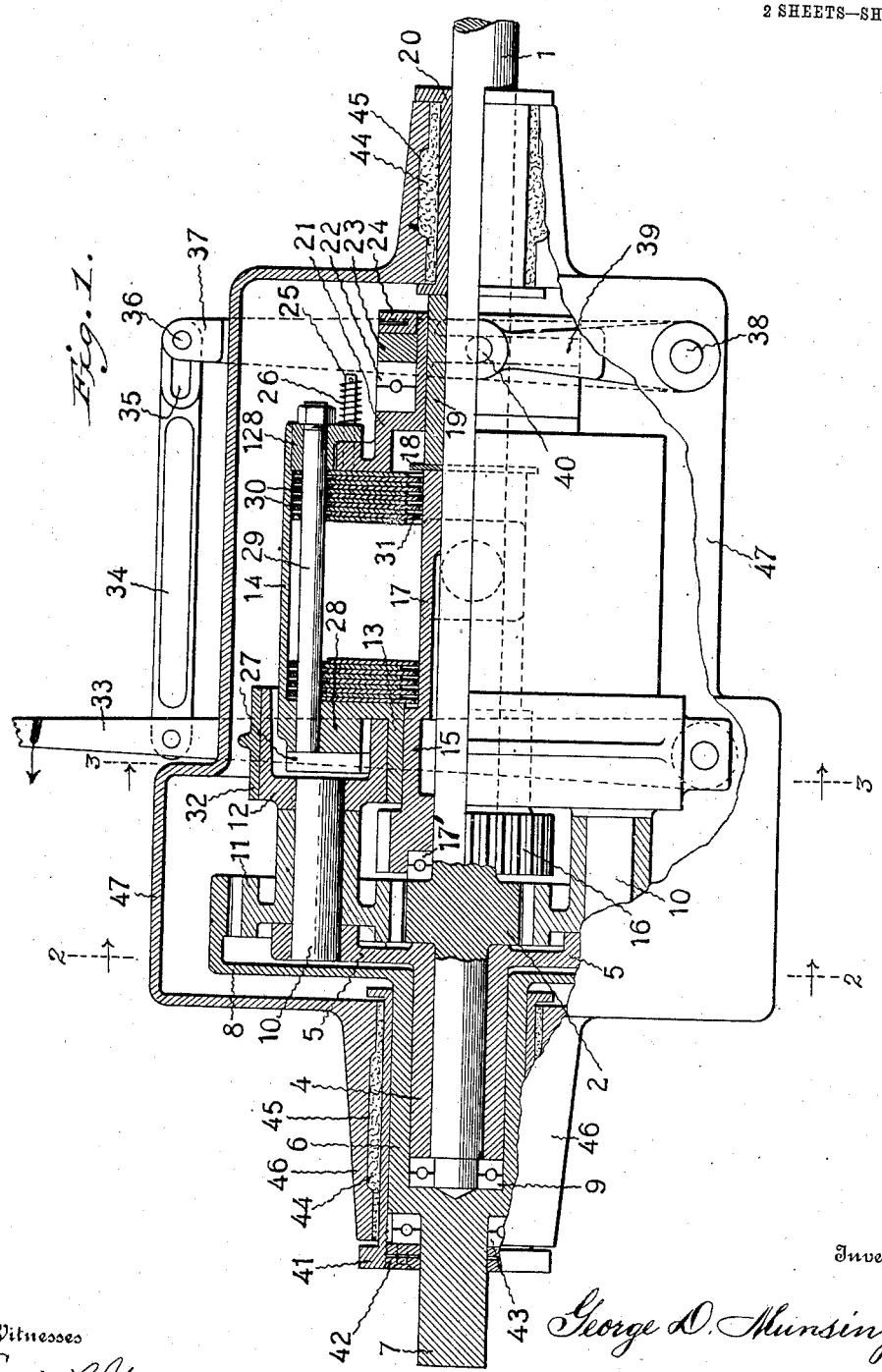

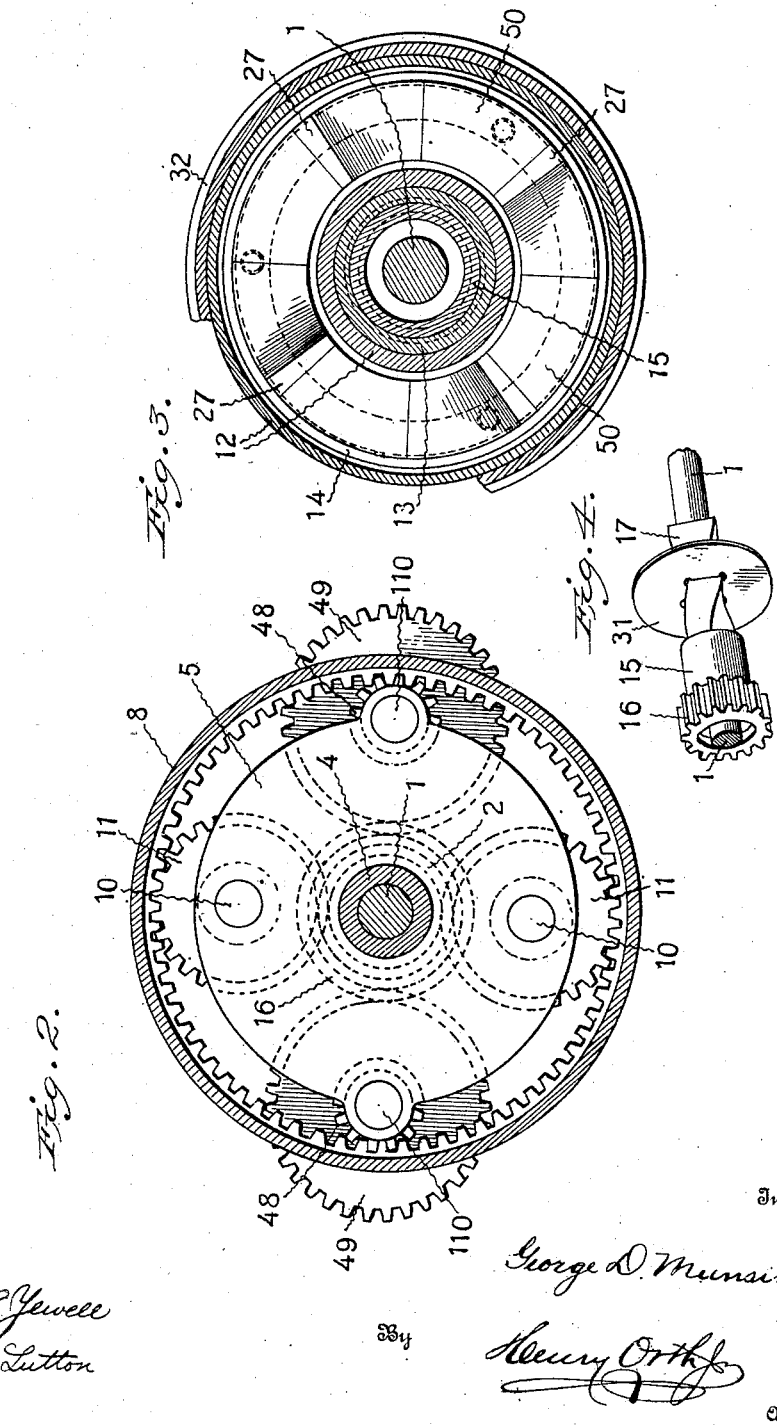

GEORGE D. MUNSING, OF NEW YORK, N. Y.

TRANSMISSION MECHANISM.

No. 868,797.

Specification of Letters Patent.

Patented Oct. 22, 1907.

Application filed April 23, 1907. Serial No. 369,787.

*To all whom it may concern:*

Be it known that I, GEORGE D. MUNSING, a citizen of the United States of America, residing at New York, in the county and State of New York, United States of America, have invented certain new and useful Improvements in Transmission Mechanism; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to variable speed mechanism and more particularly to that class of mechanism for use in motor vehicles between the driving shaft and the driven shaft and includes in combination variable speed gearing, a clutch member, and friction members as will be hereinafter more particularly described.
Referring to the drawings in which like parts are similarly designated, Figure 1 is a vertical, longitudinal, central section partly in elevation. Fig. 2 is a section taken on line 2—2 of Fig. 1. Fig. 3 is a section taken on line 3—3 of Fig. 1, and Fig. 4 is a perspective view of a detail.

The shaft 1 is directly or otherwise connected to the engine and is the driving shaft and has on it or secured to it a driving pinion 2. This shaft carries on one end adjacent the pinion 2, a sleeve 4 of a disk or spider 5.
Both the sleeve 4 and the end of the driving shaft fit into a sleeve 6 forming the end of or secured to the driven shaft 7, the sleeve 6 carrying an internal gear wheel 8. Between the two shafts is a thrust ball bearing 9 serving also as a thrust bearing for the end of sleeve 4. The disk or spider 5 has secured in it pins 10 on which are mounted planet pinions 11 preferably a pair of such diametrically opposed, that gear with both the internal gear wheel 8 and the pinion 2 on the driving shaft and are loose on their pins 10. Secured to the pins 10 is a hollow brake or friction wheel 12 rotatably mounted on the boss 13 of the axially slidable retarding drum 14 and the boss 13 is slidably mounted on a cylindrical boss 15 of the gear wheel 16 that is loose on the driving shaft 1. Thus it will be seen that the disk 5 and brake wheel 12 support between them the planet wheels or if so desired, and it may be so considered, that the planet wheels 11 and 49 and pins 10 and 110 are supported by the brake wheel 12. Between the gear wheel 16 and the pinion 2 I preferably place an antifriction thrust bearing 17'. The boss 15 has formed thereon as a continuation, preferably but not necessarily of smaller diameter than the boss, a squared portion 17 that is preferably but not necessarily given a twist as shown in the detail perspective
view in Fig. 4. This twisted portion ends at a stop plate 18 which latter is held between 17 and the short sleeve or spacer 19 also loose on the driving shaft 1 and held against lateral movement at one end by a bushing 20 and at the other end by the plate or washer 18.

Slidably mounted on the spacer 19 is a follower 21 carrying an anti-friction thrust bearing 22, a trunnion ring 23 and a nut 24 to hold the trunnion ring and thrust bearing in place. This follower 21 has secured around its periphery a number of pins 25 preferably, but not necessarily, three in number which project through and have movement through one end of the retarding drum, the follower being retracted by the coil springs 26 on said pins. The retarding drum 14 has one end 28 formed with a number of projecting clutch teeth 27 that project into the hollow of the brake wheel and secured in the end 28 of the drum are a number of rods 29 that hold the other removable end 128 of the drum in place and on which rods are loosely held friction plates 30 (the end plates only within the drum Fig. 1 being shown) and alternating with these plates are a number of similar plates 31 slidably mounted on the squared portion 17 on the loose gear wheel 16. A brake band 32 surrounds the brake wheel 12 and is operated by a lever 33 in the usual manner for example, as in my U. S. Patent 857,476, dated June 18, 1907, and which is connected by a link 34 having a slot 35 in which slides pin 36 that connects the lever 37 to the link. The lever 37 is secured to the rock shaft 38 in the casing, which shaft carries a shifting fork 39 engaging the trunnions 40 on the trunnion ring 23.

A bushing 41 surrounds the hollow portion 6 of the driven shaft 7 and has internal lock nuts 42 between which and the end of the hollow portion 6 of the driven shaft, is a thrust bearing 43. The bushings 41 and 20 at the ends of the mechanism are surrounded by a packing material 44 held in suitable pockets 45 in the sleeve-like ends 46 of the casing 47. This casing 47 is preferably filled with oil. Mounted on the disk or spider 5, Fig. 2, 90° from the planet pinions 11 are pins 110 on which are pinions 48 gearing with the internal gear wheel 8 and which pinions are rigidly connected to or formed in one piece with planet gear wheels 49 which planet gear wheels mesh with the loose gear wheel 16 on the driving shaft 1. Referring to Fig. 3 which is a section taken on line 3—3, Fig. 1 looking in the direction of the arrows, this shows four clutch teeth 27 on the drum that clutch against similar clutch members 50 having inclined backs and within the hollow of the brake wheel.

In the position shown in Fig. 1 all the parts are loose and the engine shaft 1 is free to run idle. Upon the movement of the foot or hand lever 33 in the direction of the arrow, the brake band is not applied but the link 34 pulls over rod 37 to rock the shaft 38 and fork 39 to cause the follower 21 to slide on the spacer or sleeve 19 against the stress of springs 26, this movement forcing the plates assembled in the retarding drum 14 together, first causing the whole drum to move in order that the clutch teeth 27 move into engagement with those 50 within the hollow of the brake-wheel and subsequently compressing the alternating plates 30 and 31 so as to produce friction between them. This operation causes a locking of the gear wheel 8 to the brake wheel 12 that is clutched to the drum and which by reason of the rotation of pinion 2 on the driving shaft has been revolving idly, the pinion 2 driving the planet pinions 11 with respect to the internal gear wheel 8 so that the disk 5 rotates idly in unison with the brake wheel 12 about shaft 1. As soon as the clutch members engage and friction is placed on the plates, these plates tend to lock the loose gear 16 to the drum and this loose gear 16 will then be set revolving at a speed depending upon the slip between the alternating friction plates 30 and 31 which slip in turn is dependent upon the pressure with which the follower 21 is forced forward, i. e., primarily the pressure applied to the controlling lever 33.

The loose gear wheel 16 now having been set in rotation will drive the planet gear wheels 49 which in turn drive the pinions 48 and they rotate the internal gear wheel 8 and consequently the driven shaft 7 to which it is secured. The speed of rotation of the driven shaft is therefore dependent upon the slip between the friction plates and when the follower 21 has sufficient pressure applied to it to lock the plates 30 and 31 so that there will be no difference in speed between the retarding drum 14 and the loose gear 16, the entire mechanism will rotate as a unit and the driven shaft 7 be rotated at the speed of the driving shaft 1.

In order to reverse the direction of rotation of the driven shaft the controlling lever 33 is first moved slightly in the direction opposite to the arrow thereon, this releases the lever 37 and after a certain movement of lever 33, whereby lever 37 is not affected by reason of the slot 35, the lever 37 and rocker arm 39 are moved to the right, carrying the follower plate and retarding drum 14 and clutch 27 also to the right to force or move the drum out of clutch. This movement of lever 33 applies the brake band 32 to the brake wheel 12 tending to hold brake wheel 12 stationary and in turn tending to hold the spider or disk 5 and all of the planet wheels stationary, but as the brake band begins to produce retarding friction of the brake wheel 12, there is a tendency to reversely rotate the loose gear 16 and the slightest reverse rotation thereof will cause the twist 17 thereof to rapidly disengage the plates should they stick to one another.

I claim:—

1. The combination with two shafts and a gear wheel on each of them, of planet gearing between the gear wheels, a clutch member movable in unison with the planet gearing, a coöperating clutch member and means to frictionally lock the parts of the mechanism against relative rotation.

2. In a mechanism such as described, a driving shaft and a driven shaft, planet gearing between the driving and driven shafts, an internal gear wheel on the driven shaft, and means on the driving shaft to drive the planet gearing; a clutch member rotatable in unison with the revolution of the planet gearing, a clutch member movable axially of the driving shaft to coöperate therewith, friction plates mounted in the axially movable member and friction plates through which the driving shaft passes coöperating with the friction plates in the clutch member, and means controlled by the last named plates to lock the parts of the mechanism against relative rotation.

3. In a mechanism such as described, a driving shaft and a driven shaft, an internal gear wheel on the driven shaft, planet gearing between the driving and driven shafts and means on the driving shaft to drive the planet gearing; a clutch member on which the planet gearing is mounted and which rotates in unison with the revolution of the planet gearing about the driving shaft, an axially slidable clutch drum having a clutch face coöperating therewith, friction plates loosely connected to the drum and loose alternating friction plates through which the driving shaft passes, gearing between the internal gear wheel and last named plates and means to move the drum axially and also compress or crowd the plates together.

4. In a mechanism such as described, a driving shaft, a pinion thereon, a driven shaft, an internally toothed rim on the driven shaft, a pinion loose on the driving shaft, planet gearing free to revolve about the driving shaft and in gear with said rim and pinions, and a clutch member free to rotate about the driving shaft in unison with the revolution of the planet gearing, a drum having a clutch face coöperating with the aforesaid clutch member, friction mechanism to lock the drum to the loose pinion, and a friction brake band to retard the clutch member.

5. In mechanism such as described, two shafts, a pinion on one shaft and an internal gear on the other shaft, planet gearing between the internal gear wheel and pinion, a brake wheel having a clutch face and on which the planet gearing is mounted, a gear wheel adjacent the pinion and loose on the shaft thereof and having a boss on which the brake wheel is mounted, a drum having a clutch face and movable to and from the clutch face on the brake wheel, friction plates loosely mounted in the drum to move axially thereof, friction plates alternating with the aforementioned ones mounted on the loose gear wheel, planet gearing between the loose gear wheel and internal gear wheel and means to frictionally retard the brake wheel.

6. In mechanism such as described, a driving shaft and a driven shaft, an internal gear wheel on one of the shafts and a pinion fixed on the other shaft planet gearing between them, a brake wheel on which the planet gearing is mounted, and having a clutch face, a gear wheel loose on the driving shaft, planet gearing between the loose gear wheel and driven shaft, a clutch member coöperating with the clutch face on the brake wheel, friction means between the clutch member and loose gear wheel and a brake band to engage the brake wheel.

7. The combination with two shafts and a gear wheel on each of them, of planet gearing between the gear wheels, a drum capable of rotating in unison with the revolving planet gearing, friction plates in the drum, friction plates coöperating therewith and gearing between the coöperating friction plates and one of the gear wheels.

8. The combination with two shafts, a gear wheel on one of them and an internal gear wheel on the other; of planet gearing between the two gear wheels, friction plates revoluble in unison with the planet gearing, a loose gear wheel having an elongated hub, friction plates mounted on the hub, and planet wheels between the loose gear wheel and internal gear wheel.

9. The combination with two shafts, a gear wheel on one of them and an internal gear wheel on the other, of planet gearing between the two gear wheels, a gear wheel loose on one of the shafts, planet gear wheels between the internal gear wheel and loose gear wheel and friction mechanism between the loose gear wheel and planet gearing.

10. The combination with a pair of alined shafts, a brake wheel on one of them, and means to hold the wheel from rotation of gearing for transmitting motion between the two shafts and including a loose gear wheel on one of the shafts, friction plates mounted to slide axially on said gear wheel, a drum surrounding the gear wheel, friction plates mounted in the drum and coöperating with the aforesaid ones and clutch mechanism between the drum and brake wheel.

In testimony that I claim the foregoing as my invention, I have signed my name in presence of two subscribing witnesses.

GEORGE D. MUNSING.

Witnesses:
  HARRY SHOWLER,
  WM. A. COLLINS.